United States Patent [19]

Heine et al.

[11] Patent Number: 4,628,753
[45] Date of Patent: Dec. 16, 1986

[54] LIGHTWEIGHT RING GEAR FOR A DIFFERENTIAL

[75] Inventors: Charles F. Heine; Richard L. Pifer, both of Fort Wayne, Ind.

[73] Assignee: Dana Corporation, Toledo, Ohio

[21] Appl. No.: 676,739

[22] Filed: Nov. 29, 1984

[51] Int. Cl.⁴ .................. F16H 55/12; F16H 1/14; F16H 1/40
[52] U.S. Cl. .................................. 74/447; 74/424; 74/713
[58] Field of Search ............... 74/447, 446, 713, 710, 74/424

[56] References Cited

U.S. PATENT DOCUMENTS

| | | | |
|---|---|---|---|
| 711,991 | 10/1902 | Mason, Jr. | 74/447 |
| 1,049,637 | 1/1913 | Alden | 74/713 |
| 1,219,387 | 3/1917 | Gilcrest | 74/447 |
| 1,237,443 | 8/1917 | Aldrich | 74/447 |
| 1,506,365 | 8/1924 | Domizi | 74/447 |
| 1,842,590 | 1/1932 | Dubosc | 94/447 |
| 2,069,411 | 2/1937 | Keese | 74/447 |
| 2,978,921 | 4/1961 | Donohoe | 74/447 |
| 4,261,219 | 4/1981 | Suzuki et al. | 74/710 |
| 4,468,981 | 9/1984 | Ries | 74/710 |

FOREIGN PATENT DOCUMENTS 879705 10/1961 United Kingdom .................. 74/447

*Primary Examiner*—Allan D. Herrmann
*Attorney, Agent, or Firm*—Robert M. Leonardi; Robert H. Johnson

[57] ABSTRACT

Lightweight ring gear for an epicyclic gear differential. The ring gear is fastened to a radially outwardly extending flange and includes inner and outer perimeters and a surface which is adapted to abut the flange. There are a plurality of equidistantly spaced apart cavities in the surface which extend from the inner perimeter toward the outer perimeter.

7 Claims, 3 Drawing Figures

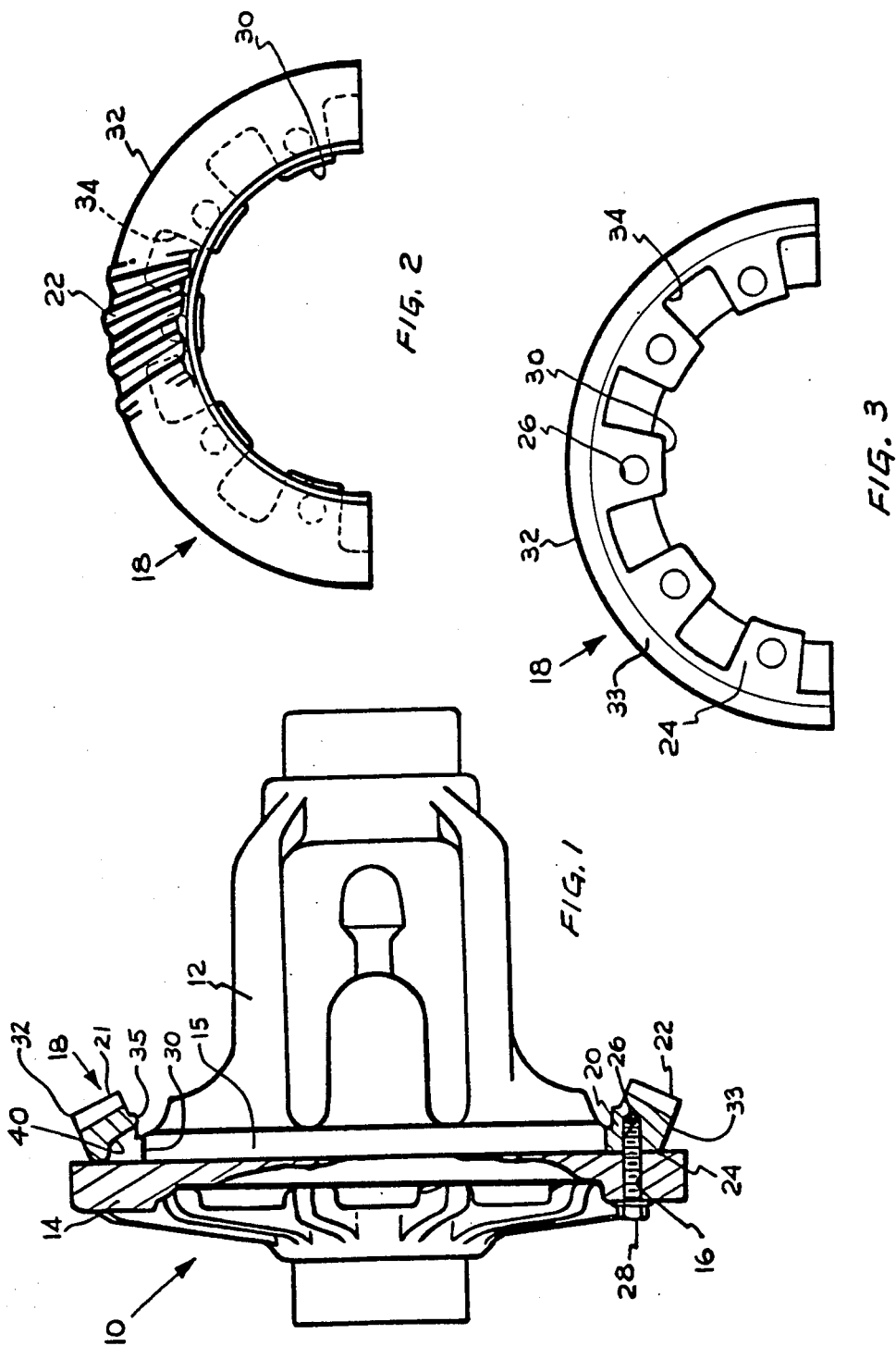

LIGHTWEIGHT RING GEAR FOR A DIFFERENTIAL

BACKGROUND OF THE INVENTION

This invention relates to automotive differentials, and more specifically to a lightweight ring gear which serves as the input element of the differential.

Because of the greatly increased cost of gasoline, the concern about conservation of natural, non-renewable resources, such as petroleum, and governmental requirements, there is a broad based effort underway to improve the fuel efficiency of automotive vehicles, such as passenger cars and trucks. One way in which the fuel efficiency of a vehicle can be improved is by reducing the weight of the vehicle. Generally, this is accomplished by reducing the weight of the various vehicular components which, taken together, provide a significant weight reduction.

Out lightweight ring gear contributes to vehicular weight reduction since it weighs 3.61 pounds (1.64 kilograms) and replaces a ring gear weighing 4.35 pounds (1.97 kilograms) for a weight reduction of 17%.

BRIEF SUMMARY OF THE INVENTION

Our invention relates to a lightweight ring gear which serves as the input element in an automotive differential. The ring gear includes an annular body with a plurality of teeth extending from said body. The body has a surface generally opposite the teeth and adapted to abut the flange of a differential cage. A plurality of threaded holes extend from the surface into the body and located between each pair of threaded holes is a cavity in the surface.

It is a principal object of our invention to provide a lightweight ring gear.

An advantage of our invention is that the weight reduction of the ring gear also decreases the rotational inertia of the ring gear, thereby reducing rotational distortion and reducing loosing of the machine screws fastening the ring gear to the flange of the differential cage.

Another advantage of our invention is the increased tooth life of the ring gear. In extended life tests a conventional ring gear of a given type and capacity normally fails at about fifteen hours. However, ring gears of the same type and capacity and made according to our invention have functioned as long as 31 hours and 35 minutes before failing in extended life tests, an extension of life durability of 139% over normal life test limits.

The above and other objects, features and advantages of our invention will become apparent upon consideration of the detailed description and appended drawing.

BRIEF DESCRIPTION OF THE DRAWING

FIG. 1 shows a differential embodying our lightweight ring gear,

FIG. 2 is an enlarged fragmentary view of our ring gear as viewed from the right in FIG. 1, and FIG. 3 is an enlarged fragmentary view of our ring gear as viewed from the left in FIG. 1.

DETAILED DESCRIPTION OF THE PREFERRED EMBODIMENT

Referring to the drawing, reference numeral 10 denotes a conventional epicyclic gear differential. Differential 10 includes a cage 12 which is rotatably journaled in an axle housing, not shown. Integral with cage 12 is a radially outwardly extending flange 14, around which there is a plurality of equidistantly spaced openings 16. Also integral with cage 12 is an axially extending ring gear pilot flange 15.

Fastened to cage 12 is a ring gear 18 which serves as the input element or member for differential 10. Ring gear 18 includes an annular body 20 having a frusto conical front surface 21 in which a plurality of teeth 22 are formed. Annular body 20 also includes a radially extending back surface 24 which is generally opposite from teeth 22 and is adapted to abut flange 14, as best seen in FIG. 1. A portion of said front surface 21 extends radially outwardly beyond said back surface 24.

Extending from surface 24 into body 20 is a plurality of equidistantly spaced threaded holes 26 which register with openings 16.

As will be apparent from viewing FIG. 1, ring gear 18 has surface 24 held in abutement with flange 14 of cage 12 by means of a plurality of machine screws or fasteners 28 which extend through openings 16 and threadably engage holes 26.

Annular body 20 of ring gear 18 includes an inner perimeter 30 and an outer perimeter in the form of an axially extending pilot surface 32. A radially outer peripheral surface 33 extends between the outer perimeter 32 and the back surface 24. A radially inner peripheral surface 35 extends between the front surface 21 or gear teeth 22 and the pilot surface 30 and is generally parallel to the outer peripheral surface 33. Extending downwardly from surface 24 of annular body 20 is a plurality of cavities 34. Each cavity 34 extends radially outwardly from inner perimeter 30 toward outer perimeter 32. Cavities 34 are identically shaped and equidistantly spaced around body 20, as best seen in FIGS. 2 and 3, each cavity 34 being disposed midway between a pair of threaded holes 26. Cavities 34 are defined by walls 40 extending parallel to the front frusto conical surface 21 (see FIG. 1).

While only a single embodiment of our invention has been described, it will be understood that various modifications can be made to our invention without departing from the spirit and scope of it.

We claim:

1. For use with a differential having an axis of rotation and including a cage having a radially extending mounting flange, an axially extending pilot flange, and a plurality of circumferentially spaced openings in the mounting flange, a lightweight ring gear comprising:
   an annular body,
   an annular radially extending back surface on said body adapted for positioning flush against said mounting flange,
   an annular axially extending pilot surface on said body adapted for positioning flush against said pilot flange,
   a frusto-conical front surface defining gear teeth,
   a radially outer peripheral surface extending between said front surface and said back surface,
   a radially inner peripheral surface extending between said front surface and said pilot surface,
   a plurality of circumferentially spaced threaded holes extending from said back surface into said body for engagement by threaded fasteners extending through the openings in said mounting flange for fastening said ring gear to said mounting flange, a plurality of circumferentially spaced cavities in said back surface, each of said cavities located between a different pair of said threaded holes and extending from said inner peripheral surface to said back surface, whereby an arcuate gap in said pilot flange is created by each of said cavities.

2. A ring gear is defined in claim 1 wherein each of said cavities is defined by a wall in said body said walls extending substantially parallel to said front frusto-conical surface of said body.

3. A ring gear as defined in claim 2 wherein said radially outer peripheral surface extending between said front surface and said back surface is substantially frusto-conical.

4. A ring gear as defined in claim 3 wherein at least a portion of said front surface defining said gear teeth is positioned radially outwardly of said back surface.

5. A ring gear as defined in claim 4 wherein at least a portion of said radially inner peripheral surface is substantially frusto-conical and substantially parallel to said radially outer peripheral surface.

6. A ring gear as defined in claim 5 wherein said cavities are identically shaped relative to each other and are equidistantly circumferentially spaced around said ring gear.

7. A ring gear as defined in claim 6 wherein said gear teeth defined by said front surface are helical.

* * * * *